United States Patent
Van Wijk et al.

(10) Patent No.: US 12,024,642 B2
(45) Date of Patent: Jul. 2, 2024

(54) COATING SYSTEM FOR RMA CROSSLINKABLE COATING COMPOSITIONS

(71) Applicant: Allnex Netherlands B.V., RB Bergen Op Zoom (NL)

(72) Inventors: Freddy Van Wijk, CA Heukelum (NL); Marcellinus Meeuwissen, VL Drunen (NL); Andrew Teasdale, RW Halsteren (NL); Bart Noordover, VZ Bergen op Zoom (NL)

(73) Assignee: ALLNEX NETHERLANDS B.V., Bergen Op Zoom (NL)

( * ) Notice: Subject to any disclaimer, the term of this patent is extended or adjusted under 35 U.S.C. 154(b) by 563 days.

(21) Appl. No.: 17/429,422

(22) PCT Filed: Feb. 25, 2020

(86) PCT No.: PCT/EP2020/054818
§ 371 (c)(1),
(2) Date: Aug. 9, 2021

(87) PCT Pub. No.: WO2020/173896
PCT Pub. Date: Sep. 3, 2020

(65) Prior Publication Data
US 2022/0112397 A1    Apr. 14, 2022

(30) Foreign Application Priority Data
Feb. 26, 2019  (EP) .................... 19159448

(51) Int. Cl.
| C09D 167/06 | (2006.01) |
| B05D 7/00 | (2006.01) |
| C08J 3/24 | (2006.01) |
| C09D 5/00 | (2006.01) |
| C09D 7/40 | (2018.01) |
| C09D 133/08 | (2006.01) |
| C09D 133/10 | (2006.01) |
| C09D 167/08 | (2006.01) |

(52) U.S. Cl.
CPC .......... *C09D 167/06* (2013.01); *B05D 7/536* (2013.01); *B05D 7/576* (2013.01); *C08J 3/246* (2013.01); *C09D 5/002* (2013.01); *C09D 7/40* (2018.01); *C09D 133/08* (2013.01); *C09D 133/10* (2013.01); *C09D 167/08* (2013.01); *B05D 2502/00* (2013.01); *B05D 2508/00* (2013.01); *C08J 2333/08* (2013.01); *C08J 2333/10* (2013.01); *C08J 2367/08* (2013.01)

(58) Field of Classification Search
CPC ........................... C09D 133/10; C09D 133/14
See application file for complete search history.

(56) References Cited

U.S. PATENT DOCUMENTS

| 6,538,059 | B1 | 3/2003 | Muller et al. |
| 2018/0282554 | A1* | 10/2018 | Avudaiappan ....... C09D 175/02 |
| 2018/0355185 | A1 | 12/2018 | Gupta et al. |
| 2020/0140693 | A1* | 5/2020 | Gessner ................. C09D 7/20 |

FOREIGN PATENT DOCUMENTS

| EP | 0 326 723 | 8/1989 |
| WO | 00/63266 | 10/2000 |
| WO | 2011/124663 | 10/2011 |
| WO | 2013/050574 | 4/2013 |
| WO | 2013/050622 | 4/2013 |
| WO | 2013/050623 | 4/2013 |
| WO | 2013/050624 | 4/2013 |
| WO | 2016/166361 | 10/2016 |
| WO | 2016/166371 | 10/2016 |
| WO | 2016/166381 | 10/2016 |
| WO | 2016/166382 | 10/2016 |
| WO | 2018/005077 | 1/2018 |
| WO | WO 2018/210846 A1 * | 11/2018 |

OTHER PUBLICATIONS

International Search Report (ISR) issued Mar. 12, 2020 in International (PCT) Application No. PCT/EP2020/054818.

* cited by examiner

*Primary Examiner* — Marc S Zimmer
(74) *Attorney, Agent, or Firm* — Wenderoth, Lind & Ponack. L.L.P.

(57) ABSTRACT

The invention relates to a coating system comprising a binder composition comprising a polymer having a Mn of 6,000 to 60,000 g/mol, a Mw of 20,000 to 300,000 g/mol, a Tg of 30 to 180° C. and an acid value of at most 3.0 mg KOH/g, and a RMA crosslinkable coating composition comprising a component A with at least two acidic protons C—H in activated methylene or methine groups, a component B with at least two activated unsaturated C=C groups and a base crosslinking catalyst C; and its use for improving adhesion of the RMA crosslinkable coating composition, in particular to wood substrates.

16 Claims, No Drawings

COATING SYSTEM FOR RMA CROSSLINKABLE COATING COMPOSITIONS

The invention relates to a coating system for improving adhesion of a RMA crosslinked coating to a substrate, to a method for coating a substrate and to the improved coated substrates obtainable by the invention.

RMA crosslinkable compositions are compositions comprising at least one RMA crosslinkable component comprising components A and B each comprising at least 2 reactive groups wherein the at least 2 reactive groups of component A are acidic protons (C—H) in activated methylene or methine groups (RMA donor group), and the at least 2 reactive groups of component B are activated unsaturated groups (C=C) (RMA acceptor group). These reactive groups react to achieve crosslinking by Real Michael Addition (RMA) reaction between said at least one RMA crosslinkable components in the presence of a base catalyst (C). Such RMA crosslinkable compositions are described in EP2556108. Herein a special catalyst C is described which is a substituted carbonate catalyst which decomposes in a coating layer to generate carbon dioxide which evaporates from the applied curing coating layer and a strong base which starts the RMA crosslinking reaction. The catalyst provides long pot-life and at the same time a high reactivity when applied as a coating layer where CO2 can escape.

The problem underlying the invention is that the RMA crosslinkable compositions may show sometimes undesirably poor adhesion properties in particular in applications on wood surfaces.

WO2016/166371 describes a method for improving adhesion of a RMA crosslinked coating on metal substrates by a coating system comprising an epoxy primer coating composition and a RMA crosslinkable coating composition. WO2018/210846 describes another method for improving adhesion of RMA crosslinked coatings on metal substrates. However, applicants have found that although such coating systems may permit to improve adhesion of RMA crosslinkable compositions on certain substrates, they are not well suitable for applications where colourless and/or transparent coatings are desired. Hence there is still a need for coating systems for this type of applications, in particular on wood substrates and for systems that allow to obtain coatings with good adhesion, sufficient hardness and mechanical properties and which allow curing at relatively low temperature or even room temperature in a couple of hours. Moreover, there is still a need for coating systems for so-called acidic substrates, in particular some wood substrates and/or putties.

Applicants have found a new coating system that overcomes above mentioned problems. In particular, Applicants have found that the use of a binder component P comprising a specific polymer as primer for an RMA composition or in combination with an RMA composition allows to obtain good curing speed and adhesion and mechanical and chemical properties, in particular on more acidic substrates, such as wood substrates.

The present invention therefore relates to a coating system for coating substrates, comprising an binder component P comprising at least one polymer PR having a number-average molecular weight (Mn) of 6,000 to 60,000 g/mol, a weight-average molecular weight (Mw) of 20,000 to 300,000 g/mol, a glass transition temperature (Tg) of 30 to 180° C. and an acid value of at most 3.0 mg KOH/g, and a RMA crosslinkable composition comprising a component A with at least 2 acidic protons C—H in activated methylene or methine groups, a component B with at least two activated unsaturated C=C groups, with the proviso that component A and component B may be part of the same molecule, a catalyst C for catalyzing the RMA crosslinking reaction between components A and B and optionally a reactivity moderator D.

The present invention also relates to a method for coating a substrate, in particular a wood substrate, and to coated substrates, with the coating system of the invention.

The binder component P used in the coating system according to the invention can be a waterbased composition, but is preferably a so-called non-aqueous composition, generally a component comprising less than 10% of water, preferably less than 5% of water, more preferably less than 1% of water or even substantially free of water.

The binder component P usually comprises at least one polymer PR and at least one solvent.

The polymer PR used in the binder component P preferably has a number-average molecular weight (Mn) of at least 10,000 g/mol. The Mn of the polymer PR preferably does not exceed 50,000 g/mol. The polymer PR used in the binder component P preferably has a weight-average molecular weight (Mw) of at least 50,000 g/mol. The Mw of the polymer PR preferably does not exceed 250,000 g/mol. The weight averaged molecular weight Mw and number averaged molecular weight Mn of the polymer are determined according to ASTM D 3593 by Gel Permeation Chromatography using polystyrene standards, more particularly using size exclusion chromatography.

The polymer PR used in the binder component P preferably has a glass transition temperature (Tg) of at least 40° C., most preferably of at least 50° C. The polymer PR used in the binder component P usually has a glass transition temperature (Tg) of at most 180° C., preferably at most 110° C. and most preferably of at most 100° C. The Tg of the polymer is measured using Mettler DSC 822E calorimeter according to DEN EN ISO 16805 and ISO 11357.

The polymer PR used in the binder component P usually has an acid value of 0 to 3.0 mgKOH/g. The acid value is preferably of at most 2.0, most preferably of at most 1.0. The acid value of the polymer is measured according to ASTM D 1639-70.

The polymer used in the binder component P preferably has an hydroxyl value of 10 to 120 mg KOH/g as measured according to ASTM E 222.

The polymer PR can be selected from a variety of polymers such as polyesters, (meth)acrylic polymers and copolymers, polycarbonates, poly(ester amide)s, polyurethanes, poly(urethane urea)s, polyethers and mixtures and hybrids thereof. Such polymers are generally known to the skilled person and are commercially available.

The polymer PR is preferably selected from (meth)acrylic copolymers. Suitable (meth)acrylic copolymers can be obtained, for instance, by the (co)polymerization of (meth)acrylic monomers, optionally with other (meaning non-(meth)acrylic) ethylenically unsaturated comonomers, in the presence of a free radical initiator.

By "ethylenically unsaturated monomer" is meant in the present invention a monomer having at least one carbon-carbon double bond which can undergo radical polymerization.

The prefix "(meth)acryl" when used to name compounds of the present invention encompasses both "acryl" and "methacryl" and refers to compounds comprising at least one $CH_2$=CHCOO— group or $CH_2$=$CCH_3$COO— group, as well as mixtures thereof and mixtures of such compounds.

The (meth)acrylic copolymer is preferably obtained from the polymerization of one or more hydroxyalkyl esters of (meth)acrylic acid (a1) and one or more non-functional (meth)acrylates (a2), and, optionally, one or more other functional (meth)acrylates (a3) and/or other (non-(meth) acrylic) ethylenically unsaturated monomers (a4).

The hydroxyalkyl esters of (meth)acrylic acid (a1) are preferably selected from those containing 1 to 20, more preferably from 1 to 14, carbons in the alkyl group. Some non limiting examples are hydroxymethyl (meth)acrylate, hydroxyethyl (meth)acrylate, hydroxypropyl (meth)acrylate, hydroxybutyl (meth)acrylate, hydroxypentyl(meth) acrylate, hydroxyhexyl (meth)acrylate hydroxyheptyl (meth)acrylate, hydroxyoctyl (meth)acrylate, hydroxynonyl (meth)acrylate, hydroxydecyl (meth)acrylate, hydroxyundecyl (meth)acrylate, hydroxydodecyl (meth)acrylate, hydroxytridecyl (meth)acrylate, hydroxytetradecyl (meth) acrylate. Also polyethylene glycol esters of (meth)acrylic acid, polypropylene glycol esters of (meth)acrylic acid, and mixed polyethylene glycol and polypropylene glycol esters of (meth)acrylic acid can be used. Preferred hydroxyalkyl esters (a1) are hydroxyethyl (meth)acrylate and hydroxypropyl (meth)acrylate.

Preferred examples of non-functional (meth)acrylates (a2) include esters of (meth)acrylic and crotonic acid with saturated alcohols containing 1 to 20, more preferably from 1 to 14, carbon atoms. Preferred (meth)acrylates (a2) are linear, branched or cyclic alkyl(meth)acrylates containing 1 to 20, more preferably from 1 to 14, carbon atoms in the alkyl group, such as methyl (meth)acrylate, ethyl (meth) acrylate, propyl (meth)acrylate, butyl (meth)acrylate, pentyl (meth)acrylate, hexyl (meth)acrylate, heptyl (meth)acrylate, octyl (meth)acrylate, nonyl (meth)acrylate, decyl (meth) acrylate, undecyl (meth)acrylate, dodecyl (meth)acrylate, tridecyl (meth)acrylate, tetradecyl (meth)acrylate and isobornyl (meth)acrylate and all isomers thereof. Also heterocyclic (meth)acrylates like for instance tetrahydrofurfuryl (meth)acrylate can be used. Methacrylates are preferred, especially methyl methacrylate and lauryl methacrylate, Monomers (a3) can be selected from functionalized (meth)acrylates such as epoxy-functional (meth)acrylates, especially glycidyl (meth)acrylate; (meth)acrylamides, N-butoxymethyl (meth)acrylamide, N-methylol (meth)acrylamide and monomers that contain besides a polymerizable group such as a (meth)acryl or (meth)acrylamide group also a keto group, such as diacetone (meth)acrylamide; an aceto acetoxy group, such as acetoacetoxyethyl (meth)acrylate or an ureido group (also called a 2-Oxo-1-imidazolidinyl group), such as N-(2-(meth)acryloyloxyethyl)-ethylene urea (also called 2-(2-Oxo-1-imidazolidinyl)ethyl (meth)acrylate) or ureido (meth)acrylate).

Examples of other ethylenically unsaturated monomers (a4) include styrenic derivatives such as styrene and vinyl toluene, vinyl esters of (branched) monocarboxylic acids, maleic acid, fumaric acid, itaconic acid, crotonic acid and monoalkylesters of maleic acid; as well vinyl acetate, N-vinylformamide, N-vinylpyrrolidone. Particularly preferred is N-vinylpyrrolidone.

Preferred monomers (a4) are styrenic derivatives such as styrene, vinyltoluene, alpha-methylstyrene, ethylstyrene, isopropylstyrene, tert-butylstyrene, 2,4-dimethylstyrene, diethylstyrene, o-methyl-isopropylstyrene, chlorostyrene, fluorostyrene, iodostyrene, bromostyrene, 2,4-cyanostyrene, hydroxystyrene, nitrostyrene, phenylstyrene. Particularly preferred is styrene.

Mixtures of any of the listed monomers can also be used.

More preferably, monomers (a2) and (a4) are those having a glass transition temperature (Tg) of their homopolymerisate of at least, more preferably higher than, 50° C. such as styrene, n-vinylpyrrolidone, dodecyl (meth)acrylate, methyl methacrylate, and mixtures thereof.

Preferred (meth)acrylic copolymers used in component P are copolymers of one or more hydroxyalkyl esters of (meth)acrylic acid, in particular hydroxyethyl methacrylate, with one or more alkyl(meth)acrylates wherein the alkyl group is a linear, branched or cyclic alkyl group comprising from 1 to 12 carbon atoms, in particular methacrylates such as methyl methacrylate and laurylmethacrylate and optionally styrene.

The (meth)acrylic copolymer does preferably contain less than 5% by weight of acid functionalized monomers; and is more preferably substantially free of acid functionalized monomers.

The (meth)acrylic copolymer is preferably obtained from:
5 to 50 wt % of hydroxyfunctional (meth)acrylate (a1),
5 to 90 wt % of non-functional (meth)acrylate (a2), and optionally
0 to 80 wt % of ethylenically unsaturated monomer (a4), especially styrene based on the sum of (a1), (a2) and (a4).

In an embodiment of the present invention, (a1), (a2) and (a4) sum up to 100 wt %.

The polymer PR present in the binder component P preferably comprises one or more (meth)acrylic copolymers, in particular such as described here above, and having a number-average molecular weight (Mn) of 10,000 to 50,000 g/mol, a weight-average molecular weight (Mw) of 50,000 to 250,000 g/mol, a glass transition temperature (Tg) of 50 to 100° C. and an acid value of 0 to 3.0 mgKOH/g. The polymer PR present in the binder component P preferably consists essential of one or more (meth)acrylic copolymers as described here above.

In another preferred embodiment of the invention, the binder composition P comprises besides one or more polymer PR as described here above, one or more other polymer (hereafter called polymer PA) different from the polymer PR. The polymer PA may have a glass transition temperature lower than 30° C., and/or a Mn lower than 6,000 and/or a Mw lower than 20,000. The polymer PA is preferably obtained through the polymerization of n-vinylpyrrolidone, more preferably together with one or more other monomers as mentioned above. The polymer PA is more preferably a copolymer comprising n-vinylpyrrolidone having a Mn lower than 6,000. The use of said polymer PA in combination with a polymer PR is very suitable for adsorbing tannins originating from the wood species, and/or acidic species present in the substrate and hence improving the drying of the RMA crosslinkable composition of the invention.

In this embodiment of the invention, binder composition P preferably comprises a polymer PR with a glass transition temperature (Tg) higher than 50° C. and another polymer PA with a Mn lower than 6,000. Applicants have found that such binder compositions permit to further enhance the drying performance of the RMA composition. In this embodiment of the invention, the binder composition P preferably comprises from 10 to 85, more preferably from 15 to 65, % by weight of polymer PA and from 15 to 90, more preferably from 35 to 85, by weight of polymer PR, relative to the total weight of polymer PR and PA.

The component P further preferably also comprises at least one organic solvent, more preferably one or more volatile organic compounds having a boiling point at atmospheric pressure of 200° C. or less. These solvents are typically used to dilute the composition to a viscosity suitable to apply the component P to the substrate. Examples of suitable volatile organic compounds are hydrocarbons, such as toluene, xylene, SOLVESSO® 100, ketones, terpenes, such as dipentene or pine oil, halogenated hydrocarbons, such as dichloromethane, ethers, such as ethylene glycol dimethyl ether, esters, such as ethyl acetate, ethyl propionate, butyl acetate or ether esters, such as methoxypropyl acetate or ethoxyethyl propionate. Also mixtures of these compounds can be used.

The component P may optionally also comprise one or more pigments, especially anti-corrosive pigments, fillers, and further additives typical for coating applications, as generally known to those skilled in the art, such as dispersants, antisettling agents, sag control agents, light or UV stabilisers, flow modifiers, levelling agents, thickeners, defoamers, wetting agents, surfactants, adhesion promoting agents, coalescence agents, corrosion inhibitors, matting agents, flame retardants, slip additives, anti-stain additives, and anti-graffiti additives.

In a specific embodiment of the current invention, the component P may further comprise a curing agent, especially an isocyanate-functional curing agent, and optionally a catalyst for catalyzing the reaction between the polymer PR and the curing agent.

In the coating system according to the invention, the binder component P comprises preferably from 5 to 50 wt % of polymer PR, more specifically (meth)acrylic copolymer, optionally from 0 to 45 wt % of polymer PA, and from 50 to 85 wt % of one or more solvents as described here above.

The total amount of the polymer PR in the binder component P, more specifically the (meth)acrylic polymer, is usually at least 5 wt %, preferably at least 15 wt %, more preferably at least 25 wt % relative to the total weight of the binder component P. When used, the total amount of the polymer PA in the binder component P, more specifically the n-vinylpyrrolidone based polymer, is usually at least 5 wt %, preferably at least 15 wt %, more preferably at least 25 wt % relative to the total weight of the binder component P. The total amount of the solvent in the binder component P, more specifically butylacetate or xylene, is preferably at least 45 wt %, more preferably at least 50 wt % relative to the total weight of the binder component P. The total amount of the solvent in the binder component P does usually not exceed 95 wt %, preferably not exceed 85 wt %, more preferably not 75 wt %, relative to the total weight of the binder component P.

The RMA crosslinkable compositions used in the coating system according to the present invention are usually compositions comprising at least one RMA crosslinkable component A comprising at least 2 reactive groups which are acidic protons (C—H) in activated methylene or methine groups (RMA donor group), and at least one RMA crosslinkable component B comprising at least 2 activated unsaturated groups (C=C) (RMA acceptor group), and at least one base catalyst (C). These reactive groups react to achieve crosslinking by Real Michael Addition (RMA) reaction between said RMA crosslinkable components in the presence of said catalyst. The component A and component B can be part of different molecules or can be present on the same molecule. Such RMA crosslinkable compositions are for example described in EP2556108; herein a special catalyst C is described which is a substituted carbonate catalyst which decomposes in a coating layer to generate carbon dioxide which evaporates from the applied curing coating layer and a strong base which starts the RMA crosslinking reaction. The catalyst provides long pot-life and at the same time a high reactivity when applied as a coating layer where $CO_2$ can escape. Suitable RMA crosslinkable compositions are known in the art; WO11/124663, WO11/124664 and WO11/124665 describe RMA crosslinkable compositions with latent base catalyst comprising carbon dioxide blocked base catalyst which generate a strong base on carbon dioxide deblocking in the coating layer. WO14/166880 describes RMA crosslinkable compositions with a catalyst that does not rely on carbon dioxide deblocking, which is particularly suitable for layers where evaporation is hindered, for example for thicker layers. WO13/050622, WO13/050623, WO13/050624 and WO13/050574 describe RMA crosslinkable compositions with special pot-life and open time moderators. WO16/166361, WO16/166381, WO16/166382 and WO2018/005077 further describe RMA crosslinkable compositions. The description of the various embodiments of the RMA crosslinkable compositions in these prior art documents is herewith enclosed by reference. In particular reference is made to the above identified prior art concerning detailed description of all components in the RMA crosslinkable composition A, B, C or D, their preparation, the amounts used in the RMA crosslinkable composition as well as for measurement methods and definitions and the description thereof is hereby incorporated by reference and applicable unless described otherwise herein. Most important features are described below in summary.

In general it is preferred that component A of the RMA crosslinkable composition used in the present invention is a malonate or acetoacetate, preferably dominantly a malonate, and component B is (meth)acryloyl compound, preferably an acryloyl compound. It is preferred that the one or more components A in the RMA crosslinkable component predominantly comprise one type of components, predominantly meaning preferably more than 50, 75, 90 and most preferably 100% of the C—H reactive groups in RMA crosslinkable component A are from one type of component A, preferably from malonate or acetoacetate and most preferably consisting predominantly of malonate, and optionally acetoacetate as the remainder component A. The most preferred component B is an acryloyl.

The one or more RMA crosslinkable components A and B can be monomeric but preferably at least one RMA crosslinkable component A or B is a polymeric component with a weight average molecular weight Mw of at least 250 g/mol, preferably a polymer having Mw between 300 and 5000, more preferably between 400 and 4000 or 500 and 3000 g/mol (as determined by GPC).

According to a particular embodiment of the present invention, the one or more RMA crosslinkable components A and components B are part of the same molecule, preferably a polymeric component with a weight average molecular weight Mw of at least 250 g/mol, more preferably a polymer having Mw between 300 and 5000, most preferably between 400 and 4000 or especially 500 and 3000 g/mol.

Preferably, one or more RMA crosslinkable components A are one or more polymers chosen from the group of polyesters, alkyds, polyurethanes, polyacrylates, epoxy resins, polyamides and polyvinyl resins which contain a malonate and/or acetoacetate moiety in the main chain, pendant, terminal or combinations thereof.

The relative amounts of the RMA crosslinkable components in the RMA crosslinkable composition are chosen such that the molar ratio of activated unsaturated reactive group C=C in component B to the activated acidic reactive groups C—H in component A is between 0.5 and 2 and preferably between 0.75 and 1.5 or 0.8 and 1.2. In case a reactive diluent is present having 2 C—H reactive groups (for example malonate) then these are also included in the total amount of C—H in the above ratio as they are RMA crosslinkable components.

The RMA crosslinkable composition preferably further comprises a reactivity moderator D comprising an X—H group that is also a Michael addition donor reactable with component B under the action of catalyst C, wherein X is C, N, P, O or S for improving open time and hence working time of application of a coating composition. The X—H group in component D, preferably an N—H group containing component, has preferably a pKa (defined in aqueous environment) of at least one unit, more preferably two units, less than that of the C—H groups in predominant component A; preferably the pKa of the X—H group in component D is lower than 13, preferable lower than 12, more preferably lower than 11, most preferably lower than 10; it is preferably higher than 7, more preferably 8, more preferably higher than 8.5. The component D preferably comprises a molecule containing the N—H as part of a group —(C═O)—NH—(C═O)—, or of a group —NH—(O═S═O)— or a heterocycle in which the nitrogen of the N—H group is contained in a heterocyclic ring preferably chosen from the group of a substituted or unsubstituted succinimide, glutarimide, hydantoin, triazole, pyrazole, immidazole or uracil, preferably chosen from the group of succinimides, benzotriazoles and triazoles. The component D is preferably present in an amount between 0.1 and 10 wt %, preferably 0.2 and 7 wt %, 0.2 and 5 wt %, 0.2 and 3 wt %, more preferably 0.5 and 2 wt % relative to the total amount of the RMA crosslinkable components A or B and component D. The component D is present in such amount that the amount of X—H groups in component D is no more than 30 mole %, preferably no more than 20, more preferably no more than 10, most preferably no more than 5 mole % relative to C—H donor groups from component A present in the crosslinkable polymer.

In principle the RMA crosslinking reaction can be catalysed by any base known in the art. Some of the usual Michael catalysts are alkali metal hydroxides, alkali metal alkoxides, quaternary ammonium hydroxides (such as tetraalkyl ammonium hydroxides), and amine compounds (such as diaza compounds, guanidine compounds, amidines including cyclic amidines, pyridine, imidazoline). Suitable catalysts are for example described in EP1462501, herewith incorporated by reference.

The catalyst C is preferably a carbon dioxide blocked strong base catalyst, more preferably a quaternary alkyl ammonium bi- or alkylcarbonate (as for example described in EP2556108). As this catalyst generates $CO_2$ it is particularly preferred for use in coating layers with a thickness up to 500, 400, 300, 200 or 150 micrometer.

A homogeneous base catalyst C, which is also more suitable for thicker coating layers, is described in EP0326723 which is a catalyst consisting of the combination of a tertiary amine and an epoxide or in PCT/EP2014/056953 describing a homogeneous catalyst C being a salt of a basic anion X— from an acidic X—H group containing compound wherein X is N, P, O, S or C, and wherein anion X— is a Michael Addition donor reactable with component B and anion X— is characterized by a pKa(C) of the corresponding acid X—H of more than two units lower than the pKa(A) of the majority component A and being lower than 10.5. Suitable catalyst described in the prior art are hereby incorporated by reference.

Another catalyst suitable to be used in the present invention is a carbamate blocked catalyst as for example described in WO2018/005077.

Preferably the RMA crosslinkable composition used in the present invention is essentially free of acidic components.

The RMA composition may comprise one or more organic solvents, preferably volatile organic solvents, required for dissolving certain components or for adjusting the RMA composition to an appropriate handling viscosity. Organic solvents for use in RMA crosslinkable compositions are common coating solvents, preferably those that do not contain acid impurities, like alkyl acetate (preferably butyl or hexyl acetate), alcohol (preferably C2-C6 alcohol), N alkyl pyrrolidine, glycolether, Dipropylene Glycol Methyl Ether, Dipropylene Glycol Methyl Ether, Propylene Glycol Methyl Ether Acetate, ketones etc. The organic solvent is more preferably an alkyl acetate, especially butyl acetate. In an embodiment of the invention, an alcohol is also used as solvent comprising 2 to 12 carbon atoms as this may improve the potlife of the RMA composition and/or the open time.

The amount of solvent can be between 0 and 90 wt %. According to a preferred embodiment of the invention, the amount of volatile organic solvent in the RMA crosslinkable composition is at least 30 wt %. According to a preferred embodiment of the invention, the RMA crosslinkable composition comprises in total from 15 and 70 wt %, more preferably between 30 and 60 wt % and most preferably between 40 and 60 wt %, of said component A, component B, catalyst C and optionally a reactivity moderator D, and preferably from 30 to 85 wt %, more preferably from 30 to 70 wt %, of at least one organic solvent as described hereabove.

In particular where a low viscosity and a low VOC is required it is preferred that the RMA crosslinkable composition comprises one or more reactive diluents which react with RMA crosslinkable components A or B. The one or more reactive diluents are preferably selected from the group of monomeric or dimeric components A, monomeric or dimeric components B, compounds A' having only 1 reactive acidic proton (C—H) in activated methylene or methine groups, compounds B' having only 1 reactive unsaturated group (C═C), most preferably alkyl acetoacetates, dialkyl malonates, mono- or diacrylates of limited molecular weight. The total amount of volatile organic solvent plus reactive solvents is between 0 and 70 wt % and the volatile organic solvent is less than 65 wt % relative to the total weight of the RMA composition.

The RMA composition may additionally comprise one or more additives, such as pigments, fillers, dispersants, anti-settling agents, sag control agents, light or UV stabilisers, flow modifiers, levelling agents, thickeners, defoamers, wetting agents, surfactants, adhesion promoting agents, coalescence agents, corrosion inhibitors, matting agents, flame retardants, slip additives, anti-stain additives, anti-graffiti additives, and mixtures thereof.

In the coating system according to the invention, the relative weight amount of RMA crosslinkable composition (total solid of component A, component B, catalyst C and optionally a reactivity moderator D) and polymer PR (solids) can vary in the range of 5:95 to 95:5.

According to a preferred embodiment of the invention, the binder component P is applied as a separate layer on a substrate and the RMA crosslinkable composition is applied on this layer. One or more layers of binder component P can be applied before applying one or more layers of RMA crosslinkable composition.

The coating system can be in the form of a kit of parts comprising the binder component P and one or more separate parts comprising the components A, B and C and, optionally D, of the RMA crosslinkable composition. Alternatively, one or more of the components A, B and C and, optionally D, can be part of the kit comprising binder component P, According to another preferred embodiment of the invention, binder component P and the RMA crosslinkable composition are mixed and applied as one layer on a substrate. According to this embodiment the coating system comprises one or more component P comprising one or more polymer PR, particularly (meth)acrylic copolymer, and, optionally, one or more polymer PA, and one or more other RMA crosslinkable coating composition such as described here above. The present invention therefore also relates to a coating composition comprising from 5 to 95 wt % of polymer PR and from 5 to 95 wt % of RMA crosslinkable composition (total solid of component A, component B, catalyst C and optionally a reactivity moderator D) and optionally from 0 to 90 wt % of polymer PA, as describe here above. The amount of RMA crosslinkable composition in said composition comprising also the polymer PR (solids), is preferably at least 20%, more preferably at least 30% and most preferably at least 50%, by weight based on the total weight (solid) of RMA crosslinkable composition and polymer PR, and optionally polymer PA. The amount of RMA crosslinkable composition in said composition comprising also the polymer PR (solids) and optionally polymer PA, preferably does not exceed 90 wt %, more preferably not exceed 75 wt % and most preferably not exceed 70 wt %, based on the total weight (solid) of RMA crosslinkable composition and polymer PR, and optionally polymer PA. The present invention therefore also relates to a coating composition comprising from 65 to 99 wt %, preferably from 65 to 70 wt %, of component P and from 1 to 35 wt % of RMA crosslinkable composition as describe here above. In this embodiment, the total amount of RMA crosslinkable composition (total solid of component A, component B, catalyst C and optionally a reactivity moderator D) and the polymer PR (solids), and optionally polymer PA, in said composition is usually at least 10 wt %, preferably at least 15 wt % and this amount preferably does not exceed 70 wt %, more preferably not 50 wt % and most preferably not 40 wt %, and the composition further preferably comprises from 20 to 90, more preferably from 50 to 85, wt % of one or more solvents, and, optionally one or more of the additives as described here above in relation with the binder component P and/or RMA crosslinkable composition. Combinations of the different embodiments, especially combinations of the preferred embodiments described here above are part of the present invention.

The coating system according to the invention is generally used for preparing a coating on a substrate. The invention therefore also relates to a process for coating a substrate wherein a coating system as described here above is applied on a substrate. The invention more particularly relates to a process for coating a substrate wherein a binder component P is applied in one or more layers on the substrate and then a layer of the RMA crosslinkable composition is applied onto this layer or layers.

The invention also relates to the use of a binder component P as a primer on a substrate for improving adhesion of a RMA crosslinkable coating and to a process for coating a substrate with the coating system according to the invention.

The invention further particularly relates to a method for applying a RMA crosslinked coating on a substrate, comprising the steps of
a) applying on a surface of a substrate, a layer comprising binder component P as described here above, preferably at a dry film thickness of at least 10 μm, more preferably of between 20 and 50 μm,
b) at least partially drying said layer, preferably at temperatures between 10 and 50° C., more preferably at ambient conditions,
c) optionally repeating steps a) and b),
d) optionally sanding the layer obtained in step b) and/or c)
e) applying over the layer obtained after step b), c) or d), at least one layer, preferably a top coating layer, of the RMA crosslinkable coating composition,
f) curing the RMA crosslinkable coating layer, preferably at temperatures between 10 and 50° C., more preferably at ambient conditions.

The invention further relates to a process for coating a substrate, preferably a wood substrate, comprising the steps of
a) mixing component P with the RMA crosslinkable composition as described here above,
b) applying on a surface of a substrate, a layer comprising the mixture of component P and the RMA crosslinkable composition, preferably at a dry film thickness of at least 10 μm, more preferably of between 20 and 50 μm,
c) at least partially curing said a layer, preferably at ambient conditions,
d) optionally repeating steps b) and c),
e) optionally sanding the layer obtained in step c) and/or d),
f) optionally applying on layer obtained in step c), d) or e), a top coating layer, optionally a RMA crosslinkable composition and curing said top coating layer.

The coating system according to the invention can be applied to a variety of substrates, in particular the substrate could be precoated with one or more other coating layer. Suitable substrates are metals especially steel substrates including all types of pretreated steel such as electrocoated, zinc (galvanized), and phosphated steel; aluminium substrates including chrome treated and non-chrome treated aluminum; more heat sensitive substrates such as plastic substrates, especially ABS substrates, polycarbonate substrates, ABS/polycarbonate substrates, glass- and carbon-fiber reinforced plastics or composites, SMC (sheet molding compound) such a polyester and glass fiber combinations, especially those used in automotive applications, poly(ethylene terephthalate), poly(butylene terephthalate), polyamide-6, polyamide-6.6, (thermoplastic) polyolefins, poly(vinyl chloride), poly(methyl methacrylate) and polystyrene. The coating system may also be applied on multisubstrate assemblies composed of metal and/or plastic parts with various different pretreatments and/or coatings including those mentioned above. According to a variant of the invention, the substrate could be coated with one or more polymer PA as described here above, before coating with one or more layer of a component P comprising polymer PR and optionally polymer PA and then with one or more RMA composition. Alternatively the substrate could be coated with one or more polymer PA as described here above before coating with one or more coating composition comprising from 5 to 95 wt % of polymer PR and from 5 to 95 wt % of RMA crosslinkable composition (total solid of component A, component B, catalyst C and optionally a reactivity moderator D) and optionally from 0 to 90 wt % of polymer PA.

Particularly suitable substrates are so-called acidic substrates, such as unsaturated polyester putties and wood. The substrates are preferably wood or wood composites, such as for example oak, mahogany and nut woods.

According to a particular embodiment of the invention, the substrate is sanded either before applying the binder component P layer and/or after at least partial drying the binder component P layer before applying the RMA coating composition.

In a particular embodiment of the invention, the primer layer obtained from the binder component P is only partially cured when applying a layer of the RMA crosslinkable coating composition. This not only saves time but also improves the adhesion with the later applied RMA crosslinkable coating layer. In view of coating appearance it may be advantageous to at least have some degree of curing. The degree of curing in partial curing can be established by the skilled person for example by taking less than the normal time needed for full curing and conversion of functional groups can be measured e.g. by spectroscopic techniques.

The curing temperatures both for the binder component P and for the RMA crosslinkable coating layer as for the mixtures of both can be well above ambient conditions, but the particular advantage of this coating system is that it can be cured at ambient conditions. So the curing temperatures can be between 0 and 100° C., but preferably between 10 and 70° C., more preferably between 10 and 50° C. The primer curing is typically done at ambient conditions and drying/curing overnight, i.e. between 10 minutes and 20 hours. However, faster curing can be achieved by forced drying at elevated temperatures.

The invention further more particularly relates to a process for coating a substrate wherein a coating composition comprising both binder component P and the RMA crosslinkable composition as described here above is applied onto a substrate, followed by curing. The curing temperatures can be between 0 and 100° C., but preferably between 10 and 70° C., more preferably between 10 and 50° C.

The layer comprising the RMA crosslinkable composition may not be the topcoat and could also be coated with a further coating layer. Preferably the RMA coating layer is the top coating layer, in particular when using a blocked catalyst such as for example the carbon-dioxide blocked latent base catalyst.

In the different coating processes according to the invention, it is clear that more than one layer of binder component P and/or RMA crosslinkable composition and/or their mixtures may be applied.

The coating system according to the invention permits to obtain coated substrates with particularly good adhesion, mechanical and chemical properties such as hardness and chemical resistance. Furthermore, the binder component P of the coating system according to the invention facilitates improved drying of the RMA crosslinkable composition of the invention. In addition the coated substrates have a good appearance and durability and weathering. The invention also relates to a coated substrate comprising at least one layer formed from the coating system according to any of the embodiments described above.

EXAMPLES

The following is a description of certain embodiments of the invention, given by way of example only.

Preparation of Acrylic Primer Resin APR1

APR1 was prepared as follows: 1165.39 g of butylacetate, 19.31 g of cumenehydroperoxide (90% in aromatic solvent mixture), 6.08 g of 2-hydroxyethylmethacrylate, 18.51 g of laurylmethacrylate, 106.43 g of methylmethacrylate and 3.07 g of butyl acetate were charged to a pressure reactor and heated to 135° C., reaching a pressure of 1.5 bar (abs.). Subsequently, 54.69 g of 2-hydroxyethylmethacrylate, 166.63 g of laurylmethacrylate, 957.87 g of methylmethacrylate and 27.6 g of butyl acetate were dosed during 60 minutes. After rinsing with 56.79 g of butyl acetate, the reaction temperature was maintained at 135° C. for 3 hours. Then, 6.82 g of t-butylperoxy-3,5,5-trimethylhexanoate in 6.82 g of butyl acetate was dosed into the mixture, followed by rinsing with 56.79 g of butyl acetate. After 1 hour of reaction at 135° C., the reaction mixture was cooled to 90° C. and the resin was diluted with 1147.21 g of butyl acetate, followed by filtration of the product through a 10 μm filter bag. APR1 has the following characteristics: GPC $M_n$=12,000 g/mol, $M_w$=60,000 g/mol, acid value=0.3 mgKOH/g, non-volatile content=35.6 wt %, viscosity at 23° C.=2.9 Pa·s, $T_g$=62° C.

Acrylic resin APR2 was prepared in a process analogously to resin APR1, but using xylene as a solvent instead of butyl acetate. The properties of this resin are specified in Table 3

Preparation of Acrylic Primer Resin APR3

APR3 was prepared as follows: in an emulsion polymerization reactor, 362.1 g of methyl ethyl ketone (MEK) was added and heated to reflux (86° C.). A monomer pre-emulsion was prepared by adding the following raw materials to the feed tank: 774.8 g of n-vinyl-2-pyrrolidone (VP), 258.3 g of ethylacrylate (EA) and 13.0 g of MEK. The feed was emulsified until a stable solution was obtained. A separate solution of 2.03 g of the initiator azo-bis-methylbutyronitril (AMBN) and 103.2 g of MEK was made is a separate dosing vessel. The monomer and initiator solutions were dosed simultaneously to the reactor in 3 hours. During the polymerization reaction the reflux temperature rises to 88° C. The dosing vessel of the monomers was rinsed with 51.7 g of MEK, the initiator vessel was rinsed with 9.7 g of MEK. After rinsing, three subsequent dosings of 2.4 g of AMBN dissolved in 4.8 g of MEK were added at 30 minutes intervals. Then, the dosing vessel was rinsed with 3.3 g of MEK and the reaction mixture was cooled to room temperature and the product was further diluted with MEK to obtain a final solids content of 50 wt %. APR3 has the following characteristics: GPC Mn=1,800 g/mol, Mw=6,100 g/mol, acid value=0.3 mgKOH/g, non-volatile content=50.0 wt %, Tg=95° C.

Preparation of Acrylic Primer Resin WAPR1

Water-borne acrylic primer resin WAPR1 was prepared as follows: in an emulsion polymerization reactor, 146.1 g of methyl ethyl ketone (MEK) was added and heated to reflux (86° C.). A monomer pre-emulsion was prepared by adding the following raw materials to the feed tank: 312.6 g of n-vinyl-2-pyrrolidone (VP), 104.2 g of ethylacrylate (EA) and 5.2 g of MEK. The feed was emulsified until a stable solution was obtained. A separate solution of 0.82 g of the initiator azo-bis-methylbutyronitril (AMBN) and 41.7 g of MEK was made is a separate dosing vessel. The monomer and initiator solutions were dosed simultaneously to the reactor in 3 hours. During the polymerization reaction the reflux temperature rises to 88° C. The dosing vessel of the monomers was rinsed with 20.9 g of MEK, the initiator vessel was rinsed with 3.9 g of MEK. After rinsing, three subsequent dosings of 0.98 g of AMBN dissolved in 2.0 g of MEK were added at 30 minutes intervals. Then, the dosing vessel was rinsed with 31.3 g of MEK and the reaction mixture was cooled to 75° C. and 269.6 g of demineralized water was added to the mixture. Subsequently, the mixture of water and MEK was distilled off until a temperature of 95° C. was reached. A solution of 1.55 g of AMBN in 2.0 g of MEK was added and the reaction mixture was held at 95° C. for 3 hours. Then, 204.7 g of demineralized water was added and vacuum distillation was performed to a MEK content<0.1%. Additional water was added to obtain a final solids content of 50% and the product was cooled to room temperature. WAPR31 has the following characteristics: GPC Mn=12,600 g/mol, Mw=51,300 g/mol, acid value=0.2 mg KOH/g, water-content (Karl-Fisher)=49.7%, Tg=100° C.

Preparation of Malonated Polyester MPE1

MPE1 was prepared as follows: into a reactor provided with a distilling column filled with Raschig rings were brought 629.6 g of neopentyl glycol, 433.3 g of hexahydrophthalic anhydride and 0.43 g of butyl stannoic acid. The mixture was polymerised at 240° C. under nitrogen to an acid value of <1 mgKOH/g. The mixture was cooled down to 130° C. and 585.2 g of diethylmalonate was added. The reaction mixture was heated to 170° C. and ethanol was removed under reduced pressure. The resin was subsequently cooled and diluted with butyl acetate to 85% solids, to yield a material with an OH value of 16 mgKOH/g, GPC $M_n$ 1750 g/mol and a malonate equivalent weight of 350 g/Eq (active C—H EQW=175 g/Eq). All mentioned AV, OHV and EQW values are determined on solid resin.

Preparation of Malonated Polyester MPE2

MPE2 is prepared as follows: Into a reactor provided with a distilling column filled with Raschig rings were brought 382 g of neopentyl glycol, 262.8 g of hexahydrophthalic anhydride and 0.2 g of butyl stannoic acid. The mixture was polymerised at 240° C. under nitrogen to an acid value of <1 mgKOH/g. The mixture was cooled down to 130° C. and 355 g of diethylmalonate was added. The reaction mixture was heated to 170° C. and ethanol was removed under reduced pressure. When the viscosity at 100° C. reached 0.5 Pa·s, the material was cooled down to 140° C. and 11.2 g of solid succinimide were added. This mixture was stirred until all succinimide was dissolved. The resin was further cooled and diluted with butyl acetate to 85% solids.

Preparation of Malonated Polyester MPE3

MPE3 was prepared as follows: Into a reactor provided with a distilling column filled with Raschig rings were brought 434.3 g of neopentyl glycol, 183.2 g of hexahydrophthalic anhydride, 82.7 g of trimethylolpropane, 72.3 g of coconut oil and 0.33 g of butyl stannoic acid. The mixture was polymerised at 240° C. under nitrogen to an acid value of <1 mgKOH/g. The mixture was cooled down to 130° C. and 486 g of diethylmalonate and 51.7 g of ethyl acetoacetate were added. The reaction mixture was heated to 170° C. and ethanol was removed under reduced pressure. The resin was subsequently cooled and diluted with butyl acetate to 83.5% solids, to yield a material with an OH value of 75 mgKOH/g, GPC Mn 1630 g/mol, a malonate equivalent weight of 395 g/Eq (active C—H EQW=198 g/Eq) and an acetoacetate equivalent weight of 3014 g/Eq (active C—H EQW=1507 g/Eq).

Preparation of Malonated Polyester MPE4

MPE4 was prepared as follows: Into a reactor provided with a distilling column filled with Raschig rings were brought 1519 g of neopentyl glycol, 640.5 g of hexahydrophthalic anhydride, 289.1 g of trimethylolpropane, 253.1 g of coconut oil and 1.10 g of butyl stannoic acid. The mixture was polymerised at 240° C. under nitrogen to an acid value of <1 mgKOH/g. The mixture was cooled down to 130° C. and 1700 g of diethylmalonate and 180.6 g of ethyl acetoacetate were added. The reaction mixture was heated to 170° C. and ethanol was removed under reduced pressure. The resin was subsequently cooled to 120° C. and 53.2 g of succinimide was added. This mixture was stirred until all succinimide was dissolved. The resin was further cooled and diluted with butyl acetate to 82.6% solids, to yield a material with an OH value of 69 mgKOH/g, GPC Mn 1570 g/mol, a malonate equivalent weight of 397 g/Eq (active C—H EQW=199 g/Eq) and an acetoacetate equivalent weight of 3048 g/Eq (active C—H EQW=1524 g/Eq).

Preparation of Malonated Polyester MPE5

MPE5 was prepared as follows: into a glass round-bottom reactor provided with a distilling column filled with Raschig rings were brought 365.9 g of neopentyl glycol (NOP), 391.9 g of hexahydrophthalic anhydride (HHPA), 38.1 g of trimethylolpropane (TMP), 276.9 g of isosorbide (IsoS) and 0.4 g of butyl stannoic acid (BSA). The mixture was brought to an under-pressure of 100 mbar while purging with a nitrogen flow for 5 minutes and subsequently brought to atmospheric pressure using nitrogen. This vacuum-nitrogen cycle was repeated three times. Thereafter, the mixture was heated to obtain a stirrable slurry, upon which another three vacuum-nitrogen cycles were carried out. Then, the temperature was ramped up to max. 240° C. and the monomer mixture was polymerised while distilling off the water condensate under nitrogen flow to an acid value (AV) of <1 mgKOH/g. The mixture was subsequently cooled down to 120° C. and 346.0 g of diethylmalonate (DEM) and 122.9 g of ethyl acetoacetate (EtAcac) were added. The reaction mixture was heated to 170° C. and ethanol was removed, first under nitrogen flow at atmospheric pressure and then under reduced pressure. The resin was subsequently cooled and diluted with butyl acetate to 82.2% solids, to yield a material with an OH value (OHV) of 79 mgKOH/g, GPC Mn 1400 g/mol, a malonate active CH equivalent weight (EQW) of 301 g/Eq and an acetoacetate CH EQW of 688 g/Eq. The overall active CH EQW is 209 g/Eq.

Composition of Catalyst C

Catalyst C consists of 43.7 g aqueous tetrabutylammonium hydroxide (55%), 19.7 g diethyl carbonate, 31.8 g n-propanol and 4.8 g water.

Determination of Molecular Weight and Molecular Weight Distribution by GPC

The molecular weight and molecular weight distribution was determined according to ASTM d) 3593 standard by Gel Permeation Chromatography using polystyrene standards, more particularly using size exclusion chromatography. The size-exclusion apparatus used was an Alliance system consisting of a pump, autosampler and He-degasser (Degasys DG-1210 from Uniflows), equipped with a PLgel 5 µm MIXED-C 600×7.5 mm Column and a PLIgel 5 µm guard column (50×7.5 mm—Polymer Laboratories). The Column oven (Separations Analytical Instruments) was set at 30° C. Tetrahydrofuran (THF—Extra Dry, Biosolve 206347)+2% acetic acid (Baker 6052) was used as eluent at a flow-rate of 0.8 ml/min. Carbon disulfide (Backer) was used as a marker. A Waters 410 refractive index was used as detector. The injection Volume was 100 µl at a concentration of 1.5 mg/ml. Polystyrene standards (Polymer Laboratories, Easical PS-1, 2010-0501 (M range 580 g/mol-8,500,000 g/mol) and Easical PS-2, 2010-0601 (M range 580 g/mol-400.000 g/mol))

were used for calibration using a third order polynomial. Software used for data-analysis was Empower (Waters). In a plot of the eluded weight fraction versus the molecular weight thus obtained, the Mn is molecular weight at which 50% of the molecules have eluded and the Mw is the molecular weight at which 50% of the total mass has eluded.

Determination of Glass Transition Temperature (Tg) by DSC

Glass transition temperature Tg was determined using Mettler DSC 822E calorimeter according to DEN EN ISO 16805 and ISO 11357. A 7-12 mg sample was first heated well above the Tg at 120° C. This temperature was kept for 5 minutes after which the temperature was brought down to at least 60° C. below the expected Tg in 10 minutes. Subsequently, the sample was heated to 120° C. with a temperature increase of 10° C./minute. The Tg is the temperature at the intersection of the tangent of the baseline and the tangent at the maximum negative slope, in a plot of the heat flow versus temperature.

The acid value is measured according to the method ASTM D1639-70.

The hydroxyl value is measured according to the method ASTM E222-17.

General Procedure for Preparation of RMA Crosslinkable Composition

A malonate containing polymer or polymer mixture (e.g. MPE1-MPE5 RMA crosslinkable component A as described here above) is mixed with ditrimethylolpropane tetraacrylate (DiTMPTA, RMA crosslinkable component B) and optionally with reactivity moderator D (e.g. succinimide, 1,2,4-triazole, ethyl acetoacetate), solvent (e.g. n-propanol, butyl acetate), and optionally pigments or other coating additives (e.g. flow and levelling additives, dispersing agents, UV stabilisers, defoamers etc.) and stirred until a homogenous paint composition was obtained. Prior to application as a coating, all mentioned formulations were activated by adding catalyst C.

TABLE 1

RMA compositions.

| RMA crosslinkable composition | D | E | F | G |
|---|---|---|---|---|
| RMA crosslinkable component A: | | | | |
| MPE1 | 2.94 | 2.45 | | |
| MPE2 | 11.85 | 9.88 | | |
| MPE3 | | | 0.71 | |
| MPE4 | | | 9.92 | |
| MPE5 | | | | 12.51 |
| RMA crosslinkable component B: DiTMPTA | 8.11 | 6.75 | 8.45 | 6.94 |
| Solvent: butyl acetate | 11.01 | 15.01 | 15.01 | 14.63 |
| Catalyst C | 1.10 | 0.91 | 0.92 | 0.92 |
| Solids [wt %] | 60 | 50 | 50 | 50 |
| Acrylate/Malonate ratio | 1.0 | 1.0 | 1.0 | 1.0 |
| Catalyst eq/resin solids [meq/g] | 0.05 | 0.05 | 0.05 | 0.05 |
| Succinimide eq/catalyst eq | 1.50 | 1.50 | 1.50 | 0 |

Examples 1 to 4

Acrylic resin APR1 was diluted to obtain a 20% weight solution in butyl acetate (in examples 1 and 2) or a 30% weight solution in butyl acetate (in examples 3 and 4). This solution was bar applied on an oak veneer substrate panel with a wet layer thickness of 125 µm and then dried at ambient conditions. The APR1 primer was sandable after 25 minutes, after which the RMA compositions (clearcoats) D and E as presented in Table 1 were bar applied thereon with a wet layer thickness of 125 µm. The RMA clearcoats were dried at ambient conditions.

The adhesion of the coating system was measured according to the cross-cut adhesion test following the ISO/DIN 2409, ASTM D3359 protocol. The ranking is briefly summarized as follows:

0: The edges of the cuts are completely smooth; none of the squares of the lattice is detached.

1: Detachment of small flakes of the coating at the intersection of the cuts. A cross-cut area not significantly greater than 5% is affected.

2: The coating has flaked along the edges and/or at the intersection of the cuts. A cross-cut area significantly greater than 5%, but not significantly greater than 15% is affected.

3: The coating has flaked along the edges partly or wholly in large ribbons, and/or it has flaked partly or wholly on different parts of the squares. A cross-cut area significantly greater than 15%, but not significantly greater than 35%, is affected.

4: The coating has flaked along the edges of the cuts in large ribbons and/or same squares have detached partly or wholly. A cross-cut area significantly greater than 35%, but not significantly greater than 65% is affected.

5: Any degree of flaking that cannot even be classified by classification 4.

Detachment of flakes or flaking means delamination as a result of poor adhesion.

The drying of the RMA coating was evaluated according to the so-called TNO method with a wad of cotton-wool. The degree of drying was assessed by dropping the wad on the surface of the coating and after leaving the wad with a weight load of 1 kg applied on the wad for 10 seconds. If no residue of the cotton-wool wad is sticking onto the surface after blowing away the wad, the drying was rated as complete, if cotton remained stuck to the surface, drying was rated as incomplete.

The results obtained are in Table 2.

TABLE 2

Adhesion of coatings system consisting of RMA clearcoats compositions D and E on primer APR1

| | APR1 solids content [wt %] | RMA composition | Drying of the RMA layer | Adhesion (ISO score) |
|---|---|---|---|---|
| Example 1 | 20 | D | Complete drying | 0 |
| Example 2 | 20 | E | Complete drying | 0 |
| Example 3 | 30 | D | Complete drying | 0 |
| Example 4 | 30 | E | Complete drying | 0 |

Examples 5 and 6 and Comparative Examples 7R-13R

As described in Example 2, the RMA crosslinkable composition E was applied onto a range of commercially available solvent-borne acrylic resins having the properties as listed in Table 3, applied as a 80 µm wet layer thickness on the oak veneer substrates. The acrylic resins were applied at the non-volatiles (NV) content listed in Table 3.

TABLE 3

Properties of solvent-borne acrylic resins.

| Example | Acrylic resin | Mn [g/mol] | Mw [g/mol] | AV [mgKOH/g] | OHV [mgKOH/g] | Tg [° C.] | NV [wt %] | Viscosity at 23° C. [Pa · s] |
|---|---|---|---|---|---|---|---|---|
| 5 | APR1 | 12000 | 60000 | 0.3 | 20 | 62 | 35.6 | 2.9 |
| 6 | APR2 | 21600 | 98500 | 0.5 | 20 | 64 | 31 | 1.5 |
| 7R | CPR1 | 6300 | 35600 | 19 | 36 | 67 | 40 | 1.8 |
| 8R | CPR2 | 6700 | 30800 | 2.2 | 62 | 13 | 55 | 1.5 |
| 9R | CPR3 | 6900 | 24200 | 3.1 | 62 | 47 | 54 | 1.5 |
| 10R | CPR4 | 5200 | 16000 | 8.8 | n/a | 52 | 56 | 3.1 |
| 11R | CPR5 | 2800 | 8100 | 0.12 | 35 | 19 | 60 | 0.3 |
| 12R | CPR6 | 8200 | 59000 | 10.0 | 56 | 84 | 40 | 3.0 |

The drying of the RMA coating and the adhesion was evaluated as described here above and presented in Table 4. In addition, the RMA composition was applied directly on the oak veneer substrate not containing an acrylic primer layer (comparative example 13R).

TABLE 4

| Example | Primer resin | RMA coating drying | adhesion |
|---|---|---|---|
| 5 | APR1 | Complete drying | 0 |
| 6 | APR2 | Complete drying | 0 |
| 7R | CPR1 | Incomplete drying | n/a |
| 8R | CPR2 | Complete drying | 5 |
| 9R | CPR3 | Incomplete drying | n/a |
| 10R | CPR4 | Incomplete drying | n/a |
| 11R | CPR5 | Incomplete drying | n/a |
| 12R | CPR6 | Incomplete drying | n/a |
| 13R | None (RMA comp. E only) | Complete drying | 5 | n/a = non applicable since the drying was incomplete

As can be seen, acrylic resins having properties not responding to claimed invention did not allow to obtain at the same time a satisfying drying and adhesion.

Example 14 to 19 and Comparative Examples 20R to 22R

Analogue to Example 1, RMA compositions E, F and G where applied as at a 50 μm wet topcoat either on the substrate as such (Comparative Examples 20R, 21R and 21R) or primed with acrylic resin APR1.

The adhesion results obtained are presented in Table 5.

TABLE 5

| Example | Primer APR1 - wet layer thickness | RMA composition | Adhesion |
|---|---|---|---|
| 20R | none | E | 5 |
| 21R | none | F | 5 |
| 22R | none | G | 5 |
| 14 | 50 μm | E | 0 |
| 15 | 50 μm | F | 0 |
| 16 | 50 μm | G | 0 |
| 17 | 80 μm | E | 0 |
| 18 | 80 μm | F | 0 |
| 19 | 80 μm | G | 0 |

Examples 23 to 34 and 35 to 46

Blends comprising acrylic resin APR2 and an RMA crosslinkable composition comprising a 57/43 by weight mixture of MPE1 and MPE2, resulting in a succinimide content of 0.8 equivalent per equivalent of catalyst. Also, the RMA crosslinkable composition contained 2 catalyst equivalents of 1,2,4,-triazole as an additional reactivity moderator. DiTMPTA was used as the RMA acceptor and the ratio donor/acceptor was 1/1. In Tables 7 and 8, the ratio between APR2 and the RMA crosslinkable composition are indicated based on solid resin. The mixtures of resins were diluted to the hybrid primer solids content mentioned in the table.

TABLE 7

Blending of primer APR2 with RMA crosslinkable composition: data for 1 layer of said mixed primer on oak

| | | | | | Chemical resistance | | | |
|---|---|---|---|---|---|---|---|---|
| Example | % APR2 | % RMA comp. | Hybrid Primer solids content | Adhesion 1 layer on oak | MEK | EtOH 48% in water, 3 hrs | demi water, 24 hrs | Atrix hand cream, 24 hrs |
| 23 | 58 | 42 | 41.7 | 0 | + | − | ++ | ++ |
| 24 | 58 | 42 | 20 | 0 | −− | −− | ++ | ++ |
| 25 | 45 | 55 | 41.7 | 0 | + | ++ | ++ | ++ |
| 26 | 45 | 55 | 20 | 0 | −− | −− | ++ | ++ |
| 27 | 34 | 66 | 41.7 | 0 | + | ++ | ++ | ++ |
| 28 | 34 | 66 | 20 | 0 | −− | −− | ++ | −− |
| 29 | 26 | 74 | 41.7 | 1 | + | ++ | ++ | ++ |
| 30 | 26 | 74 | 20 | 0 | −− | −− | ++ | −− |
| 31 | 19 | 81 | 41.7 | 5 | ++ | ++ | ++ | ++ |
| 32 | 19 | 81 | 20 | 0 | −− | − | + | −− |

TABLE 7-continued

Blending of primer APR2 with RMA crosslinkable composition: data for 1 layer of said mixed primer on oak

| | | | | | Chemical resistance | | | |
|---|---|---|---|---|---|---|---|---|
| Example | % APR2 | % RMA comp. | Hybrid Primer solids content | Adhesion 1 layer on oak | MEK | EtOH 48% in water, 3 hrs | demi water, 24 hrs | Atrix hand cream, 24 hrs |
| 33 | 13 | 87 | 41.7 | 5 | ++ | ++ | ++ | ++ |
| 34 | 13 | 87 | 20 | 0 | -- | - | + | -- |

++ = excellent,
+ = good,
+/- = sufficient,
- = insufficient,
-- = poor

In examples 35 to 46 presented in Table 8, a second layer of the blend of primer APR2 and RMA composition was applied on the first layer.

TABLE 8

Blending of primer APR2 with RMA crosslinkable composition: data for 2 layers of said mixed primer on oak.

| | | | | | | Chemical resistance | | | |
|---|---|---|---|---|---|---|---|---|---|
| Example | % APR2 | % RMA comp. | Hybrid Primer solids content | König hardness [s] | Adhesion 2 layers on oak | MEK | EtOH 48% in water, 3 hrs | demi water, 24 hrs | Atrix hand cream, 24 hrs |
| 35 | 58 | 42 | 41.7 | 140 | 0 | + | - | ++ | ++ |
| 36 | 58 | 42 | 20 | 178 | 0 | -- | -- | ++ | ++ |
| 37 | 45 | 55 | 41.7 | 162 | 1 | + | ++ | ++ | ++ |
| 38 | 45 | 55 | 20 | 194 | 0 | -- | -- | ++ | ++ |
| 39 | 34 | 66 | 41.7 | 168 | 1 | + | ++ | ++ | ++ |
| 40 | 34 | 66 | 20 | 209 | 0 | -- | -- | ++ | ++ |
| 41 | 26 | 74 | 41.7 | 179 | 5 | + | ++ | ++ | ++ |
| 42 | 26 | 74 | 20 | 218 | 5 | -- | ++ | ++ | ++ |
| 43 | 19 | 81 | 41.7 | 158 | 5 | ++ | ++ | ++ | ++ |
| 44 | 19 | 81 | 20 | 227 | 4 | -- | - | ++ | ++ |
| 45 | 13 | 87 | 41.7 | 191 | 5 | ++ | ++ | ++ | ++ |
| 46 | 13 | 87 | 20 | 232 | 3 | -- | ++ | ++ | ++ |

++ = excellent,
+ = good,
+/- = sufficient,
- = insufficient,
-- = poor

The results here above show that a blend of 45/55 APR2/RMA comp. provides the best compromise in properties.
In an additional set of experiments, the first layer of the mixed primer as described in examples 23 to 34 was topcoated with RMA clearcoat E (as described in Table 1) and applied on different woods: oak, mahogany and nut woods.
Excellent adhesion of this topcoat as well as good hardness and chemical resistance was obtained.

Examples 48 to 52 and Comparative Examples 47R and 53R

In those examples APR2 was blended with vinyl pyrrolidone-containing polymer APR3 in the proportions shown in Table 9,
The thus obtained sealer mixtures were bar applied on the highly acidic substrates rosewood and an unsaturated polyester (UP) putty in one or two layers (100 μm wet thickness; 18 μm dry thickness per layer), dried at ambient conditions and then the RMA composition according to composition F (Table 1) was spray applied thereto in one layer and dried at ambient conditions.

For comparison the results obtained by applying the RMA composition directly on the substrate are also reported (comparative Example 47 R—no sealer).

TABLE 9

| | | | Drying of RMA crosslinkable clearcoat | | | | | |
|---|---|---|---|---|---|---|---|---|
| | | | rosewood | | | UP putty | | |
| Example | % APR2 | % APR3 | no sealer | 1 layer | 2 layers | no sealer | 1 layer | 2 layers |
| 47R | 0 | 0 | -- | | | -- | | |
| 48 | 100 | 0 | | +/- | ++ | | - | ++ |
| 49 | 74.4 | 25.6 | | + | ++ | | +/- | ++ |
| 50 | 52.5 | 47.8 | | + | ++ | | +/- | ++ |
| 51 | 32.8 | 67.2 | | +/- | ++ | | +/- | ++ |

TABLE 9-continued

| | | | Drying of RMA crosslinkable clearcoat | | | | |
|---|---|---|---|---|---|---|---|
| | | | rosewood | | | UP putty | |
| Example | % APR2 | % APR3 | no sealer | 1 layer | 2 layers | no sealer | 1 layer | 2 layers |
| 52 | 15.4 | 84.6 | – | ++ | | – | | + |
| 53R | 0 | 100 | – | + | | – | –– | +/– |

++ = excellent,
+ = good,
+/– = sufficient,
– = insufficient,
–– = poor

As can be seen from the results in Table 9, APR2 (example 48) strongly improves the drying of the RMA crosslinkable clearcoat applied on top of the sealer layer(s).
Blending APR2 with APR3 (examples 49-52) further improves the drying performance of the RMA crosslinkable clearcoat, especially at APR3/APR2 ratios below 85/15 (example 52).

Example 55 and Comparative Example 54R

The water-borne sealer WAPR1 was applied on the acidic substrates: oak wood and a water-borne basecoat.
On oak wood, 1 layer (wet film thickness 125 µm, dry film thickness 31 µm) of WAPR1, diluted with water to a solids content of 25%, was applied. On top of this WAPR1 layer, RMA crosslinkable composition D was applied and drying was evaluated.
As can be seen in Table 10, WAPR1 strongly improves the drying of the RMA crosslinkable composition applied on top of this sealer, compared to a system were no sealer is applied on the oak wood (comparative Example 54R).
On the water-borne basecoat, 1 layer or two layers of WAPR1 (wet film thickness 30 µm, dry film thickness 15 µm per layer) were applied. On top of this WAPR1 layer, RMA crosslinkable composition F was applied and drying was evaluated.
As can be seen in Table 10, WAPR1 strongly improves the drying of the RMA crosslinkable composition applied on top of this sealer, compared to a system were no sealer is applied on the WB basecoat.

TABLE 10

| | | Drying of RMA crosslinkable clearcoat | | | | |
|---|---|---|---|---|---|---|
| | | oak wood | | WB basecoat | | |
| Example | sealer | no sealer | 1 layer | no sealer | 1 layer | 2 layers |
| 54R | none | – | | –– | | |
| 55 | WAPR1 | | ++ | | + | ++ |

++ = excellent,
+ = good,
+/– = sufficient,
– = insufficient,
–– = poor

The invention claimed is:

1. A coating system for coating substrates, comprising an binder component P comprising at least one polymer PR having a number-average molecular weight (Mn) of 6,000 to 60,000 g/mol, a weight-average molecular weight (Mw) of 20,000 to 300,000 g/mol, a glass transition temperature (Tg) of 30 to 180° C. and an acid value of at most 3.0 mgKOH/g and a RMA crosslinkable composition comprising a component A with at least 2 acidic protons C—H in activated methylene or methine groups, a component B with at least two activated unsaturated C=C groups, with the proviso that component A and component B may be part of the same molecule, a catalyst C for catalyzing the RMA crosslinking reaction between components A and B and optionally a reactivity moderator D.

2. The coating system according to claim 1, wherein the polymer PR in the binder component P is a (meth)acrylic copolymer.

3. The coating system according to claim 1, wherein the component P further comprises at least one polymer PA different from polymer PR.

4. The coating system according to claim 1, wherein the binder component P is applied as a primer layer on the substrate and wherein the RMA crosslinkable composition is applied on said primer layer.

5. The coating system according to claim 1, wherein the binder component P and the RMA crosslinkable composition are mixed and applied as one layer on the substrate.

6. The coating system according to claim 1, wherein the polymer PR has a number-average molecular weight (Mn) of 10,000 to 50,000 g/mol, a weight-average molecular weight (Mw) of 50,000 to 250,000 g/mol, a glass transition temperature (Tg) of 50 to 100° C. and an acid value of 0 to 3.0 mg KOH/g.

7. The coating system according to claim 1, wherein the binder component P comprises from 5 to 50 wt % of polymer PR and from 50 to 85 wt % of one or more solvents, and optionally from 0 to 45 wt % of a polymer PA different from polymer PR.

8. The coating system according to claim 1, wherein the RMA crosslinkable composition comprises in total from 30 to 70 wt % of said component A, component B, catalyst C and optionally a reactivity moderator D, and from 30 to 70 wt % of at least one organic solvent.

9. The coating system according to claim 1, wherein the RMA crosslinkable coating composition comprises a RMA crosslinkable component with component A being predominantly malonate or an acetoacetate, preferably malonate, and component B being an acryloyl.

10. The coating system according to claim 1, wherein the relative amounts of the RMA crosslinkable components in the RMA crosslinkable composition are chosen such that the molar ratio of activated unsaturated reactive group C=C in component B to the activated acidic reactive groups C—H in component A is between 0.5 and 2.

11. The coating system according to claim 1, wherein the reactivity moderator D comprises an X—H group that has a pKa of at least one unit less than that of the C—H groups in predominant component A.

12. The coating system according to claim 1, wherein the catalyst C is a carbon dioxide blocked strong base or a carbamate blocked catalyst.

13. Coating composition comprising from 5 to 95 wt % of polymer PR, from 5 to 95 wt % of RMA crosslinkable composition (total solid of component A, component B, catalyst C and optionally a reactivity moderator D) and optionally, from 0 to 90 wt % of a polymer PA different from polymer PR, as described in claim 1, based on the total weight (solid) of RMA crosslinkable composition, polymer PR and polymer PA.

14. A process for applying a coating system according to claim 1 comprising the steps of
   a) applying on a surface of a substrate, a layer comprising binder component P at a dry film thickness of at least 10 um, b) at least partially drying said layer at ambient conditions,
c) optionally repeating steps a) and b),
d) optionally sanding the layer obtained in step b) and/or c)
e) applying over the layer obtained after step b), c) or d), at least one layer of the RMA crosslinkable coating composition, and
f) curing the RMA crosslinkable coating layer at ambient conditions.

15. A process for applying a coating system according to claim 1 comprising the steps of
a) mixing the component P with the RMA crosslinkable composition,
b) applying on a surface of a substrate a layer comprising the mixture of component P and the RMA crosslinkable composition at a dry film thickness of at least 10 um,
c) at least partially curing said layer at ambient conditions,
d) optionally repeating steps b) and c),
e) optionally sanding the layer obtained in step c) and/or d), and
f) optionally applying on the layer obtained in step c), d) or e), a top coating layer and curing said top coating layer.

16. A coated substrate comprising at least one layer formed from the coating system according to claim 1.

* * * * *